Patented Nov. 19, 1935

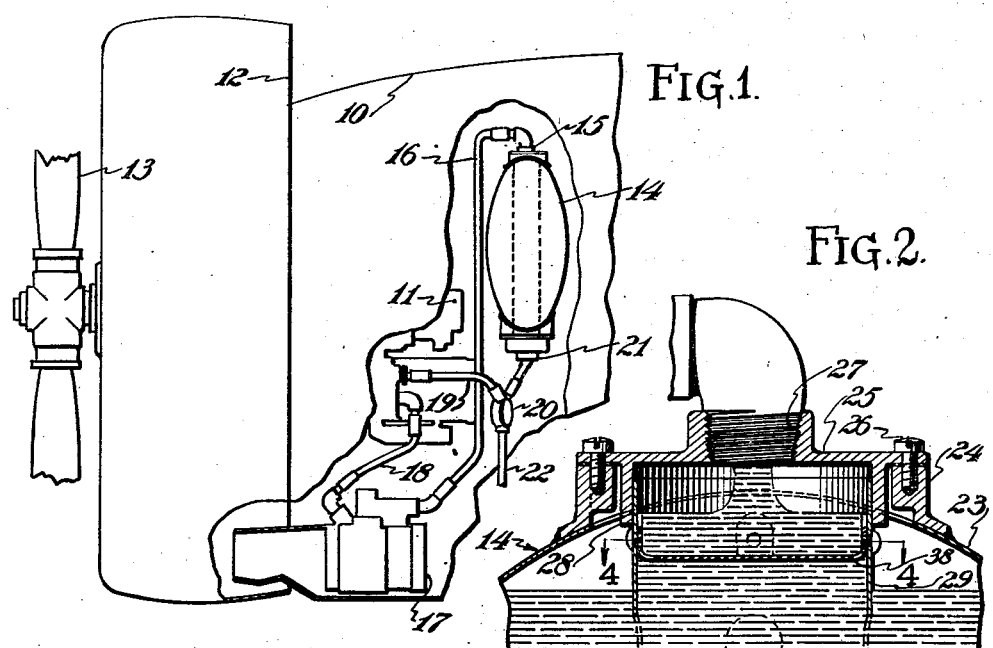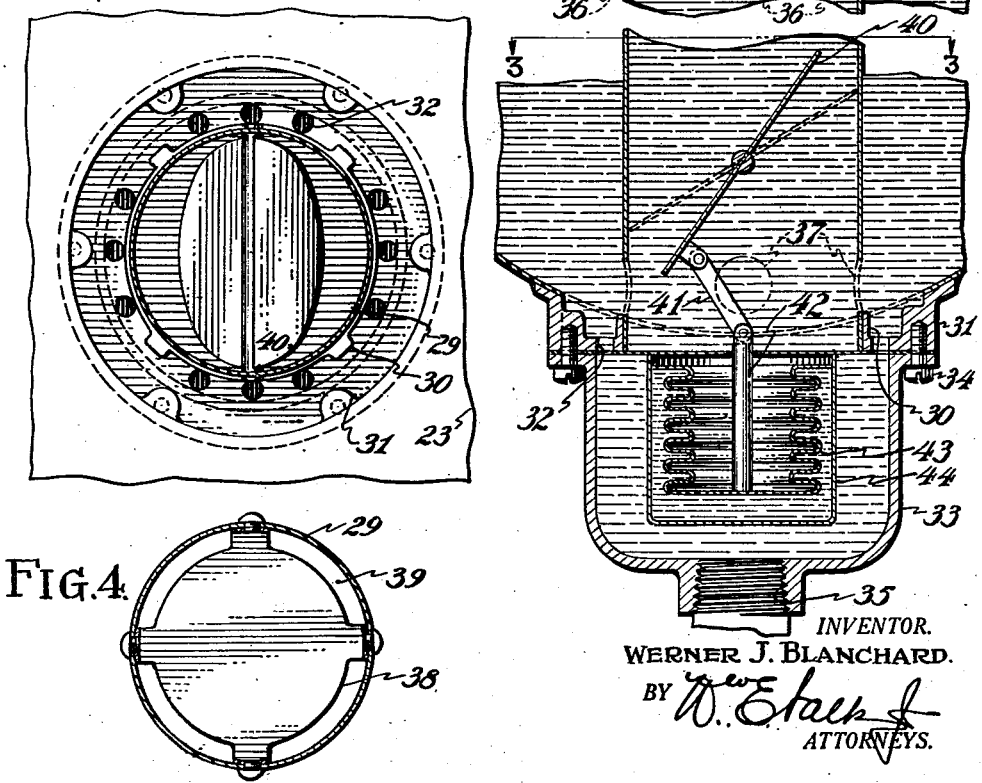

2,021,282

UNITED STATES PATENT OFFICE 2,021,282

LUBRICATING SYSTEM

Werner J. Blanchard, Kenmore, N. Y., assignor to Curtiss Aeroplane & Motor Company, Inc., a corporation of New York Application September 15, 1934, Serial No. 744,143

8 Claims. (Cl. 123—196)

This invention relates to lubricating systems for aircraft power plants, and is particularly concerned with improvements in apparatus for controlling the temperature of lubricating oil.

In the conventional aircraft power plant installation, the engine is provided with a force feed lubricating system including one or more pumps, and oil is carried in a separate tank, the tank being connected to the engine by one pipe which permits oil to flow from the engine to the tank, and by another pipe which permits oil to flow from the tank to the engine. In engine operation, the oil becomes heated, and suitable oil cooling radiators are placed in series with one or the other of the oil pipes. Means have been provided in the past for controlling the air flow through the oil radiator or for controlling the oil flow therethrough, in order that the lubricating oil may be maintained at desirable temperatures. Likewise, means have been provided in the oil tank to permit of a rapid warming up of a small portion of the oil in the tank, after which the main body of oil in the tank may be warmed at leisure. This invention provides thermostatic means for controlling oil temperature, both with respect to the air flow through the oil radiator, or with respect to the amount of oil which is permitted to actively flow through the tank.

An object of the invention is to provide an improved means for controlling lubricating oil temperatures in aircraft power plant installation.

A further object is to provide an automatic thermostatic means for regulating oil temperature.

Another object is to provide an improved oil tank construction permitting of automatic oil temperature control.

A still further object is to provide a thermostatic device in conjunction with a lubricating system, in an aircraft power plant.

For further objects, reference may be made to the annexed specification and to the drawings, in which:

Fig. 1 is a side elevation, partly broken away, of the forward portion of an aircraft showing a lubricating oil circuit embodying this invention;

Fig. 2 is an enlarged fragmentary section through an aircraft oil tank embodying the device of this invention;

Fig. 3 is a section on the line 3—3 of Fig. 2;

Fig. 4 is a section on the line 4—4 of Fig. 2;

Figure 5:
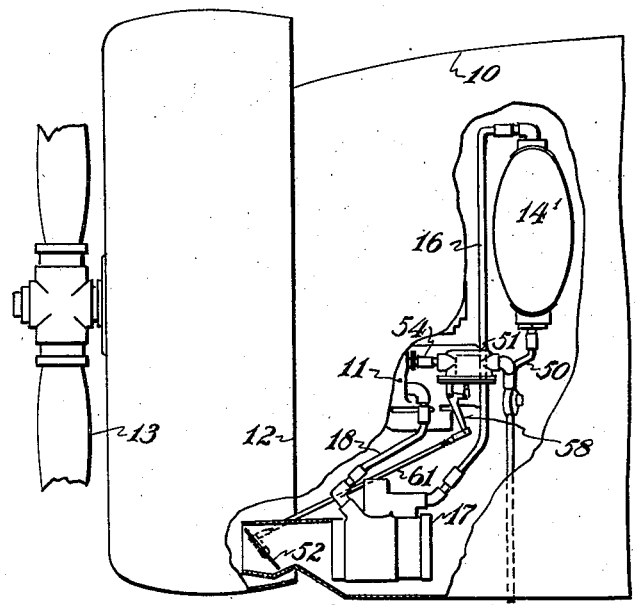
Fig. 5 is a fragmentary side elevation, partly broken away, showing an alternative embodiment of the invention.

In Fig. 1, 10 designates the forward portion of an airplane fuselage carrying an engine 11 of the radial cylinder type, the cylinders being surrounded by a low drag cowling 12. The engine shaft carries a propeller 13 at its forward end. An oil tank 14 is mounted in the fuselage 10, and is provided with an upper oil inlet connection 15 communicating by means of a conduit 16 with an oil cooling radiator 17. The radiator 17, in turn, communicates with the outlet side of a scavenging oil pump carried within the engine 11, by means of a conduit 18. The suction side of the oil pressure pump mounted in the engine casing is connected to a conduit 19 communicating, through a valve 20 with an oil outlet connection 21 at the bottom of the oil tank 14. The valve 20 is provided with a drain pipe 22 and, by means of the valve, the lubricating system may be drained. The construction of the tank 14 is shown in detail in Figs. 2, 3 and 4, the tank comprising a casing 23 of any preferred shape, having a boss 24 on its upper surface, this boss providing an opening adapted to be covered by a plate 25. The plate is attached by screws 26 to the boss 24. The plate is provided with a threaded opening 27 within which the connection 15 is adapted to be screwed. An annular flange 28 extends inwardly from the plate 25 and serves as a locating means for the upper end of a tubular sleeve 29, the lower end of the sleeve being located in an annular flange 30 formed as part of a boss 31 fixed to the bottom of the tank. Between the flange 30 and the boss 31 are a plurality of openings 32. To the boss 31, a cup 33 is attached by screws 34, the cup at its lower end having a threaded opening 35 within which the connection 21 may be screwed. A plurality of radial openings 36 are formed in the upper portion of the sleeve 29, and a plurality of openings 37 are formed in the lower end thereof.

A baffle 38 is attached within the upper end of the sleeve 29, above the openings 36, this baffle having cut away portions 39, to permit oil entering from the connection 27 to flow past the baffle and downwardly within the sleeve 29. Intermediate the openings 36 and 37, a butterfly valve 40 is pivoted, this valve being capable of movement to a position wherein the sleeve is substantially closed, or to a position where the sleeve is open. A link 41 connects the valve 40 with a pin 42 carried on a flexible diaphragm 43, the diaphragm being sealed within a casing 44.

Fluid is introduced between the diaphragm and the casing, this fluid preferably having a rather high coefficient of expansion. Thereby, upon cooling of the fluid within the casing 44, it will contract to effect opening of the valve 40. Conversely, upon warming of the fluid within the casing 44, the fluid will expand to effect closing of the valve 40.

The operation of the oil tank is as follows: Assuming the engine and oil to be cold, starting of the engine will immediately start circulation of the oil therein and oil will be passed through the conduit 16, through the connection 27, and into the tank. By virtue of the oil in the tank being cold, the valve 40 will be open, and the oil will most readily flow downwardly through the sleeve 29, out through the openings 37, thence through the openings 32, and back to the engine through the connection 35 and the conduit 19. As the engine continues to operate, the oil will become warmed, and in passing by the casing 44 will warm the thermostatic elements therein to effect closure of the valve 40. Such closure will tend to prevent flow of oil through the sleeve 29, causing the oil entering the tank to flow into the main body of the tank through the openings 36. Oil drawn from the tank will then necessarily flow from the main body of the tank, through the openings 32 and back to the engine.

The organization shown is particularly useful in cold weather operation as it expedites the warming up of the engine by re-circulating, at first, only a small quantity of oil. The heat from the oil passing through the sleeve 29 tends to warm up that oil surrounding the sleeve while permitting operation of the engine at full power with the small amount of quickly warmed oil. Automatically, as the oil is warmed and is rendered sufficiently fluid, the oil in the main body of the tank is permitted to circulate through the engine, preventing the overheating of that small quantity of oil which circulated when the engine was first started.

In conjunction with the oil cooler 17, an adequate temperature control for the oil is accomplished in warm or cold weather. It will be observed that the full quantity of oil circulating through the engine is passed through the cooler, the cooler being normally designed to take care of the maximum cooling conditions which may be encountered in service. Over-cooling of the oil being circulated is prevented, however, since the valve organization in the tank will automatically cause the oil flow from the tank to be governed by the thermostat and the valve 40. Even in cold weather, with the oil cooler 17 excessively cooling all that oil which is scavenged from the engine, the thermostatic control mechanism within the tank will tend to allow warm oil to pass back to the engine since, if the oil entering the tank is excessively cooled, the valve 40 will open and the circulation of only that small body of oil within the sleeve will be permitted whereby the oil will be maintained in a warm condition.

Figure 6:
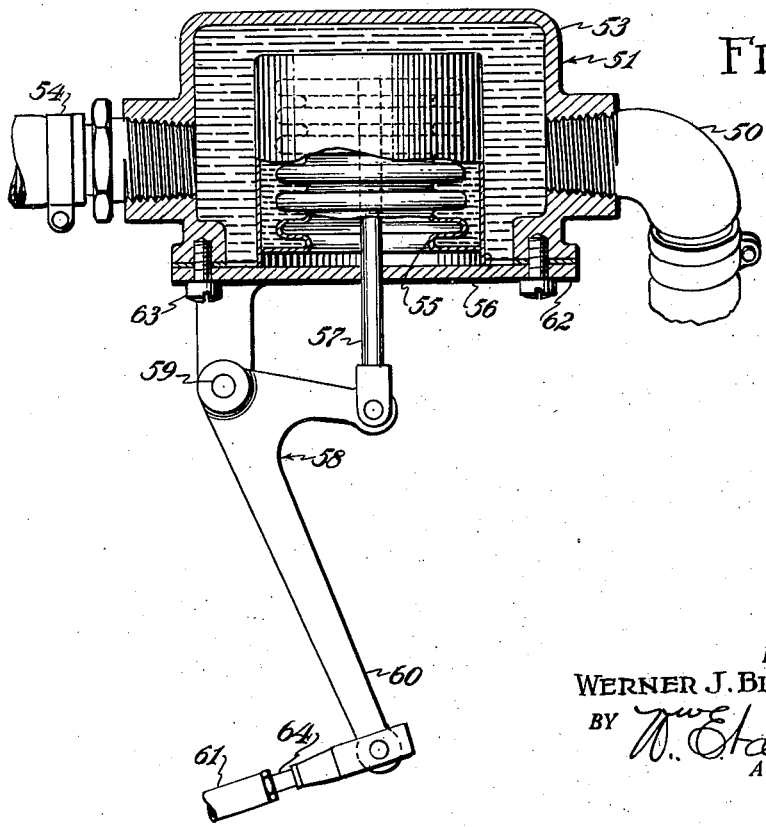
Fig. 6 is an enlarged section through the alternative oil temperature control apparatus.

Figs. 5 and 6 show an alternative organization of thermostatic oil temperature control wherein the tank 14' is of conventional type. In this embodiment, conduits 50 and 54 provide outlets from the tank to the engine, and between these conduits is a thermostatic device 51 having a connection with a shutter 52 controlling air flow through the oil radiator 17. The oil radiator 17 is, as before, connected by means of conduits 18 and 16 with the engine 11 and with the tank 14', respectively. The device 51 comprises a cup 53 communicating through the conduit 50 with the tank and through the conduit 54 with the engine. Within the cup, a flexible diaphragm element 55 is enclosed in a casing 56, the space between the two being filled with a fluid having a high coefficient of expansion. The diaphragm is connected by a pin 57 with a bell crank 58 pivoted at 59 to the cup 53, the arm 60 of the bell crank being connected by a link 61 with the oil radiator shutter 52. The elements 55 to 60, inclusive, may be conveniently carried on a cover plate 62 adapted to be screwed to the open side of the cup 53 by means of screws 63. Adjustment of the mechanism may be effected by a screw connection 64 in the link 61 whereby the proper degree of opening of the shutter 52 may be determined with reference to the action of the thermostat comprised by the elements 55 and 56. It will be seen that oil entering the engine from the tank 14' will all pass through the thermostatic device 51, which in turn will control the degree of cooling imposed upon the oil leaving the engine on its way to the tank 14'.

The oil radiator 17, though not shown in detail, is of conventional and well known construction comprising a nest of honeycomb tubes contained within a casing, the oil being adapted to circulate between the tubes, and the cooling air being adapted to pass through the tubes. If it is deemed desirable, the devices shown in Figs. 1 to 4, inclusive, and those shown in Figs. 5 and 6 may be used in combination on a single installation to attain a still finer degree of oil temperature control. Similarly, a single thermostatic unit could readily be utilized to control air flow through the oil radiator 17, and to simultaneously control the valve 40 which controls the flow of oil within the oil tank shown in the first four figures.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an aircraft power plant installation including a heat generating engine, an oil tank having an inlet conduit through which oil passes from said engine to said tank, an exit conduit through which oil passes from said tank to said engine, an enlarged perforate conduit within said tank with the ends of which said inlet and exit conduits respectively communicate, a thermostat device immersed in the oil adjacent said exit conduit, and a valve operated by said thermostat for opening and closing said perforate conduit.

2. In an aircraft power plant installation including an engine, a lubricating oil tank therefor, inlet and outlet conduits to and from said tank connected with said engine, said inlet conduit entering said tank substantially at the top thereof and said outlet conduit entering said tank substantially at the bottom thereof, a tubular sleeve connected at its ends with said conduits, said sleeve having openings adjacent the ends thereof for communication with the interior of said tank, a valve in said sleeve intermediate said sleeve openings, and a a thermostatic device in intimate contact with the oil for operating said valve.

3. In an oil tank for use with an aircraft power plant and having spaced inlet and outlet connections, means for directing the oil flow through said tank directly from said inlet to said outlet connection, and means responsive to change in temperature of the circulating oil for directing the oil flow through the main body of said tank.

4. In an oil tank for use with an aircraft power plant and having spaced inlet and outlet connections, means within said tank for causing circulation of oil in a direct path between said connections, and thermostatically controlled means responsive to oil temperature for diverting oil circulation from said direct path to an indirect path through the body of said tank.

5. A lubricating oil tank for aircraft having a top inlet connection, an annular flange extending inwardly from the tank body and encircling said connection, said tank having an opening opposite said inlet connection, a sleeve having perforations, insertable through said opening for engagement with said flange, and a fitting carrying an outlet connection adapted to be attached to said tank over said opening for holding said sleeve within said tank.

6. A lubricating oil tank for aircraft having a top inlet connection, an annular flange extending inwardly from the tank body and encircling said connection, said tank having an opening opposite said inlet connection, a sleeve having perforations, insertable through said opening for engagement with said flange, a fitting carrying an outlet connection adapted to be attached to said tank over said opening for holding said sleeve within said tank, a valve within said sleeve, and a thermostat mounting in said fitting for operating said valve.

7. In an oil tank for a power plant, means dividing said tank into two compartments, an inlet and an outlet for said tank, said means having openings to permit the interflow of oil between said compartments, and thermostatically controlled means responsive to the oil temperature for closing one said compartment to the passage of oil therethrough from said inlet to said outlet.

8. In a tank having a restricted fluid conduit therewithin, said conduit defining outer and inner fluid containing compartments, said conduit having openings to permit the flow of fluid between said compartments, an inlet and an outlet for said tank, and a fluid temperature responsive valve for closing said inner compartment, upon closure of which the contained fluid is constrained to flow through said outer compartment in its passage from said inlet to said outlet.

WERNER J. BLANCHARD.